US012696144B2

(12) United States Patent
Yang et al.

(10) Patent No.: US 12,696,144 B2
(45) Date of Patent: Jul. 28, 2026

(54) TRANSFERRING MONITORING EVENT INFORMATION DURING A MOBILITY PROCEDURE

(71) Applicant: Telefonaktiebolaget LM Ericsson (publ), Stockholm (SE)

(72) Inventors: Yong Yang, Kållered (SE); Wenliang Xu, Shanghai (CN); Yunjie Lu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/406,742

(22) Filed: Jan. 8, 2024

(65) Prior Publication Data

US 2024/0147313 A1     May 2, 2024

Related U.S. Application Data

(63) Continuation of application No. 17/599,195, filed on Sep. 28, 2021, now Pat. No. 11,902,838, which is a (Continued)

(51) Int. Cl.
*H04W 36/00* (2009.01)
*H04W 8/20* (2009.01)

(52) U.S. Cl.
CPC ......... *H04W 36/0033* (2013.01); *H04W 8/20* (2013.01)

(58) Field of Classification Search
CPC ............... H04W 36/305; H04W 76/10; H04W 36/00226; H04W 8/20; H04W 36/0033
See application file for complete search history.

(56) References Cited

U.S. PATENT DOCUMENTS

2016/0359750 A1   12/2016   Miklos et al.
2017/0012947 A1    1/2017   Lee et al.
(Continued)

FOREIGN PATENT DOCUMENTS

CN      108141842 A      6/2018
CN      108668307 A     10/2018
(Continued)

OTHER PUBLICATIONS

Notification to Grant for Chinese Patent Application No. 202080024870. 6, mailed Apr. 4, 2024, 6 pages.
(Continued)

*Primary Examiner* — Anez C Ebrahim
(74) *Attorney, Agent, or Firm* — Withrow & Terranova, PLLC

(57) ABSTRACT

Methods and systems for transferring monitoring event information during a mobility procedure are provided. According to one aspect, a method for transferring monitoring event information during a mobility procedure comprises, at a first network node: receiving and storing subscription information indicating that a second network node has subscribed to get notification when there is a data delivery failure involving a User Equipment (UE), followed by the UE becoming reachable; detecting a data delivery failure involving the UE, and setting a flag to indicate that a data delivery failure involving the UE has occurred; receiving, from a third network node, a mobility related request; sending, to the third network node, a response to the mobility related request, comprising an indication that the third network node should notify the second network node when the UE becomes reachable and/or when then UE enters the IDLE state.

16 Claims, 11 Drawing Sheets

Related U.S. Application Data continuation of application No. PCT/EP2020/057903, filed on Mar. 23, 2020.

(56) References Cited

U.S. PATENT DOCUMENTS

| | | |
|---|---|---|
| 2017/0012956 A1 | 1/2017 | Lee et al. |
| 2017/0013453 A1 | 1/2017 | Lee et al. |
| 2019/0132782 A1* | 5/2019 | Kim .................... H04W 36/305 |
| 2021/0112462 A1* | 4/2021 | Zhu ................... H04W 36/0066 |

FOREIGN PATENT DOCUMENTS

| | | |
|---|---|---|
| CN | 109076427 A | 12/2018 |
| WO | 2016106561 A1 | 7/2016 |

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 16)," Technical Specification 23.401, Version 16.2.0, 3GPP Organizational Partners, Mar. 2019, 418 pages.

Author Unknown, "Technical Specification Group Services and System Aspects; Architecture enhancement to facilitate communications with packet data networks and applications (Release 15)," Technical Specification 23.682, Version 15.7.0, 3GPP Organizational Partners, Dec. 2018, 124 pages.

Author Unknown, "Technical Specification Group Services and System Aspects; Architecture enhancement to facilitate communications with packet data networks and applications (Release 16),"

Technical Specification 23.682, Version 16.2.0, 3GPP Organizational Partners, Mar. 2019, 126 pages.

Author Unknown, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 16)," Technical Specification 29.274, Version 15.7.0, 3GPP Organizational Partners, Mar. 2019, 383 pages.

Author Unknown, "Technical Specification Group Core Network and Terminals; Home Subscriber Server (HSS) diameter interfaces for interworking with packet data networks and applications (Release 15)," Technical Specification 29.336, Version 15.6.0, 3GPP Organizational Partners, Mar. 2019, 75 pages.

Author Unknown, "Technical Specification Group Core Network and Terminals; 5G System; Access Mobility Management Services; Stage 3 (Release 15)," Technical Specification 29.518, Version 15.3.0, 3GPP Organizational Partners, Mar. 2019, 190 pages.

Ericsson, "C4-191102: Control of notifications to SCEF," Third Generation Partnership Project (3GPP), TSG-CT WG4 Meeting #90, Apr. 8-12, 2019, 3 pages, Xi'an, P.R. China.

Examination Report for Australian Patent Application No. 2020247208, mailed Aug. 9, 2022, 4 pages.

Examination Report for Australian Patent Application No. 2020247208, mailed Jun. 20, 2023, 3 pages.

First Office Action for Chinese Patent Application No. 202080024870.6, mailed Oct. 8, 2023, 21 pages.

Examination Report for European Patent Application No. 20715784.3, mailed Feb. 8, 2023, 7 pages.

International Search Report and Written Opinion for PCT/EP2020/057903, mailed Jun. 15, 2020, 16 pages.

Non-Final Office Action for U.S. Appl. No. 17/599,195, mailed May 25, 2023, 15 pages.

Notice of Allowance for U.S. Appl. No. 17/599,195, mailed Oct. 10, 2023, 7 pages.

\* cited by examiner

*Monitoring Event Information*

TRANSFERRING MONITORING EVENT INFORMATION DURING A MOBILITY PROCEDURE

This application is a continuation of U.S. patent application Ser. No. 17/599,195, filed Sep. 28, 2021, now U.S. Pat. No. 11,902,838, which is a 35 U.S.C. § 371 national phase filing of International Application No. PCT/EP2020/057903, filed Mar. 23, 2020, which claims the benefit of International Application No. PCT/CN2019/080136, filed Mar. 28, 2019, the disclosures of which are hereby incorporated herein by reference in their entireties.

TECHNICAL FIELD

This application relates to monitoring event information during high latency communication, and in particular to transferring monitoring event information during a mobility procedure.

BACKGROUND

Telecommunications systems such as the Evolved Packet System (EPS) and the Fifth Generation System (5GS) support high latency communication, e.g., communication involving devices that communicate rarely or after relatively long delays, such as devices that enter Power Saving Mode (PSM) to reduce battery power consumption and that periodically awake to send data or to listen for data.

To support high latency communication, an Application Server (AS) may subscribe to some monitoring event, e.g., via the Home Subscriber Server (HSS) to the serving Mobility Management Entity (MME) or Serving General Packet Radio Service (GPRS) Support Node (SGSN), to get notification if the User Equipment (UE) becomes reachable for downlink data.

According to the Third Generation Partnership Project (3GPP) Technical Specification (TS) 23.682, to support high latency communication, the AS may subscribe to get notification of an event "network application triggering when the UE is available after a Data Downlink Notification (DDN) failure" for a UE, so that the AS can get notification only when there has been some data delivery failure followed by the UE becoming reachable. This subscription information is provided to the serving node (MME/SGSN) at registration. The serving node will store the subscription and will set a notify-on-available-after-DDN-failure flag after a DDN failure. If the flag is set when the UE next contacts the network, the serving node notifies the Service Capability Exposure Function (SCEF) and/or the AS that the UE is reachable, and then will clear the flag.

An important use case for this feature is for an application that wants to communicate with a UE that sleeps for a long time. If downlink packets from the application are not delivered, the application recognizes that the UE is not available (e.g., by lack of response within a reasonable time from the UE), and then awaits notification from the network (e.g., from the MME/SGSN via the SCEF) of UE reachability. So that the application server can try to deliver the data the UE again.

FIG. 1 is a reproduction of TS 23.682, FIG. 5.7.1.2-1: Event Configuration—Availability Notification after DDN Failure, which provides the Event configuration procedure.

FIGS. 2A and 2B are reproductions of the first and second halves, respectively, of TS 23.682, FIG. 5.7.1.3-1: Notification—Availability Notification after DDN Failure, which provides the notification procedure. These figures are relative to EUTRAN, but the equivalent figure for UTRAN can be directly derived from this. It is noted that in FIG. 2B, there are two notifications (step 8 and step 12) from the mobility management node to the SCEF: one is to notify that the UE becomes reachable, and the other is to notify that the UE enters the IDLE state.

SUMMARY

The conventional method described in TS 23.682 has several flaws, however. One involves an idle mode mobility transfer, and another involves a connected mode mobility transfer.

Idle mode mobility transfer. When a UE is transferred from a source AMF/MME/SGSN to a target AMF/MME/SGSN as part of a mobility procedure, the state of the notify-on-available-after-DDN-failure flag being set to 1 (i.e., the indication that the AMF/MME/SGSN needs to notify the SCEF/AS when the UE becomes reachable for downlink data) is not transferred from the source AMF/MME/SGSN to the target AMF/MME/SGSN during an idle mode mobility procedure, with the result that target AMF/MME/SGSN will not notify the SCEF/AS that UE becomes reachable, because the target AMF/MME/SGSN was not aware that the SCEF/AS desired such notification.

Connected mode mobility transfer. When a UE that is still being served by the source AMF/MME/SGSN node enters a connected mode—meaning that the source AMF/MME/SGSN node should notify the SCEF and/or AS that the UE has become reachable for downlink data—becomes involved in a handover procedure (i.e. a mobility procedure) towards a target AMF/MME/SGSN (e.g., an inter-MME handover procedure), the target AMF/MME/SGSN does not know whether or not it should send another notification to the SCEF/AS to report that UE gets into idle state. There is a similar issue with respect to a UE-reachability event: the target AMF/MME/SGSN does not know if the notifications have or have not been sent to the SCEF/AS.

Moreover, such a monitoring event may be subscribed with at least two different monitoring types, i.e., "AVAILABILITY_AFTER_DDN_FAILURE" and "AVAILABILITY_AFTER_DDN_FAILURE_AND_IDLE_STATUS_INDICATION".

Finally, it is possible that the source AMF/MME/SGSN has reported to the SCEF/AS that the UE is reachable but has not yet reported that the UE has entered the IDLE state (e.g., the UE performed a Tracking Area Update (TAU) procedure).

The same weaknesses of the existing system are also applicable to UE_REACHABILITY events.

The subject matter disclosed herein provides a solution to enable a target node, such as a Mobility Management Entity (MME), a Serving General Packet Radio Service Support Node (SGSN), a Core Access and Mobility Management Function (AMF), or other node, to correctly notify a Service Capability Exposure Function (SCEF), Network Exposure Function (NEF), Application Server (AS), or other node, during an inter-MME/SGSN/AMF mobility procedure.

According to one aspect of the present disclosure, a method for transferring monitoring event information during a mobility procedure comprises, at a first network node: receiving and storing subscription information indicating that a second network node has subscribed to get notification when there is a data delivery failure involving a User Equipment (UE) followed by the UE becoming reachable; detecting a data delivery failure involving the UE, and, in response to detecting the data delivery failure, setting a flag to indicate that a data delivery failure involving the UE has occurred; receiving, from a third network node, a mobility related request; sending, to the third network node, a response to the mobility related request, the response comprising at least one of: an indication that the third network node should notify the second network node when the UE becomes reachable; and/or an indication that the third network node should notify the second network node when then UE enters the IDLE state.

In some embodiments, the first network node comprises a Mobility Management Entity (MME), a Serving General Packet Radio Service Support Node (SGSN), and/or a Core Access and Mobility Management Function (AMF).

In some embodiments, the second network node comprises a Service Capability Exposure Function (SCEF), a Network Exposure Function (NEF), and/or an Application Server (AS).

In some embodiments, the third network node comprises a MME, SGSN, and/or AMF.

In some embodiments, the flag to indicate that a data delivery failure involving the UE has occurred comprises a notify on available after a Data Downlink Notification (DDN) failure flag.

In some embodiments, the mobility related request is associated with an idle mode mobility procedure or a connected mode mobility procedure.

In some embodiments, the mobility related request comprises a context request message, an identification request message, a forward relocation request message, a create context message, and/or a Hypertext Transfer Protocol (HTTP) request to invoke a transfer custom method on an individual UE context resource Uniform Resource Identifier (URI).

In some embodiments, the indication that the third network node should notify the second network node when the UE becomes reachable and the indication that the third network node should notify the second network node when then UE enters the IDLE state are comprised in a Monitoring Event Information data structure.

According to another aspect of the present disclosure, a method for transferring monitoring event information during a mobility procedure comprises, at a third network node: sending, to a first network node, a mobility related request; receiving, from the first network node, a response to the mobility related request, the response comprising at least one of: an indication that the third network node should notify a second network node when the UE becomes reachable; and/or an indication that the third network node should notify the second network node when then UE enters the IDLE state.

In some embodiments, the first network node comprises an MME, SGSN, and/or AMF.

In some embodiments, the second network node comprises a SCEF, NEF, and/or AS.

In some embodiments, the third network node comprises an MME, SGSN, and/or AMF.

In some embodiments, the mobility related request is associated with an idle mode mobility procedure or a connected mode mobility procedure.

In some embodiments, the mobility related request comprises a context request message, an identification request message, a forward relocation request message, a create context message, and/or a HTTP request to invoke a transfer custom method on an individual UE context resource URI.

In some embodiments, the indication that the third network node should notify the second network node when the UE becomes reachable and the indication that the third network node should notify the second network node when then UE enters the IDLE state are comprised in a Monitoring Event Information data structure.

In some embodiments, the method further comprises sending, to the second network node, a notification that the UE is reachable and/or in the IDLE state.

According to yet another aspect of the present disclosure, a network node for transferring monitoring event information during a mobility procedure comprises one or more processors, and memory storing instructions executable by the one or more processors whereby the network node is operable to perform the steps of any of the methods disclosed herein.

According to yet another aspect of the present disclosure, a network node configured to transfer monitoring event information during a mobility procedure comprises processing circuitry configured to perform the steps of any of the methods disclosed herein.

According to yet another aspect of the present disclosure, a network node for transferring monitoring event information during a mobility procedure comprises modules operable to perform the steps of any of the methods disclosed herein.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
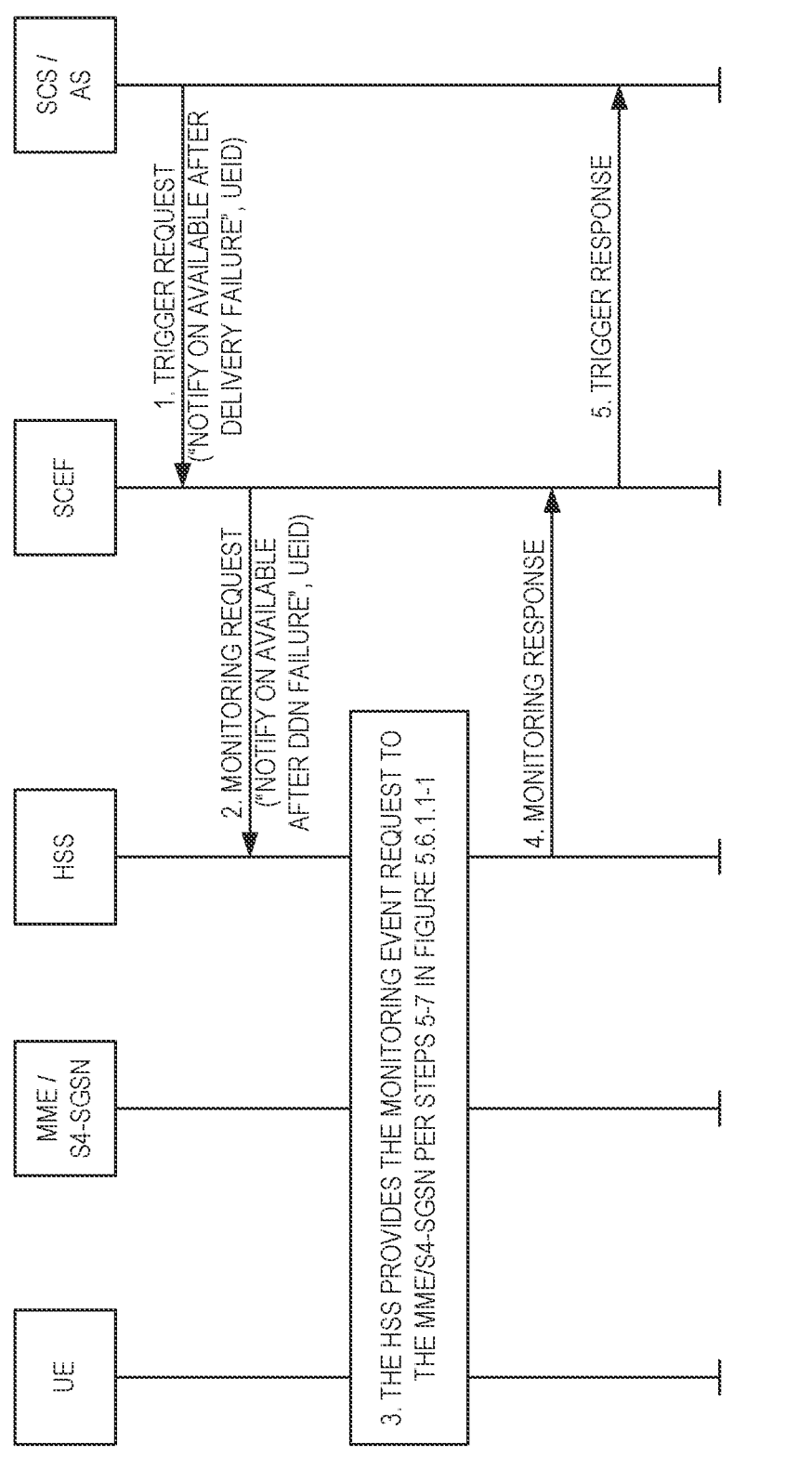
FIG. 1 is a reproduction of TS 23.682, FIG. 5.7.1.2-1: Event Configuration—Availability Notification after DDN Failure, which provides the conventional Event configuration procedure.
Figure 2A:
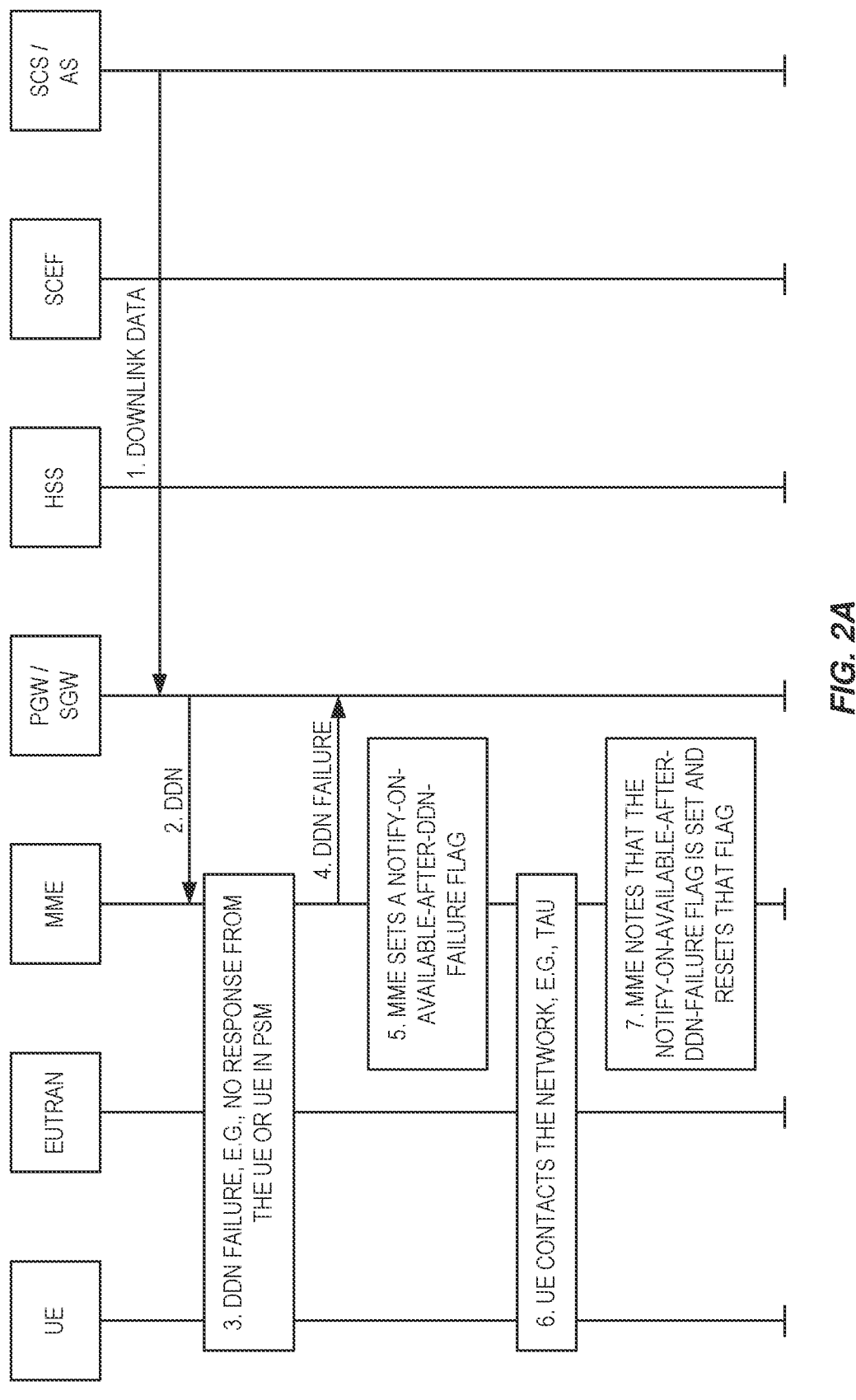
FIGS. 2A and 2B are reproductions of the first and second halves, respectively, of TS 23.682, FIG. 5.7.1.3-1: Notification—Availability Notification after DDN Failure, which provides the conventional notification procedure.
Figure 2B:
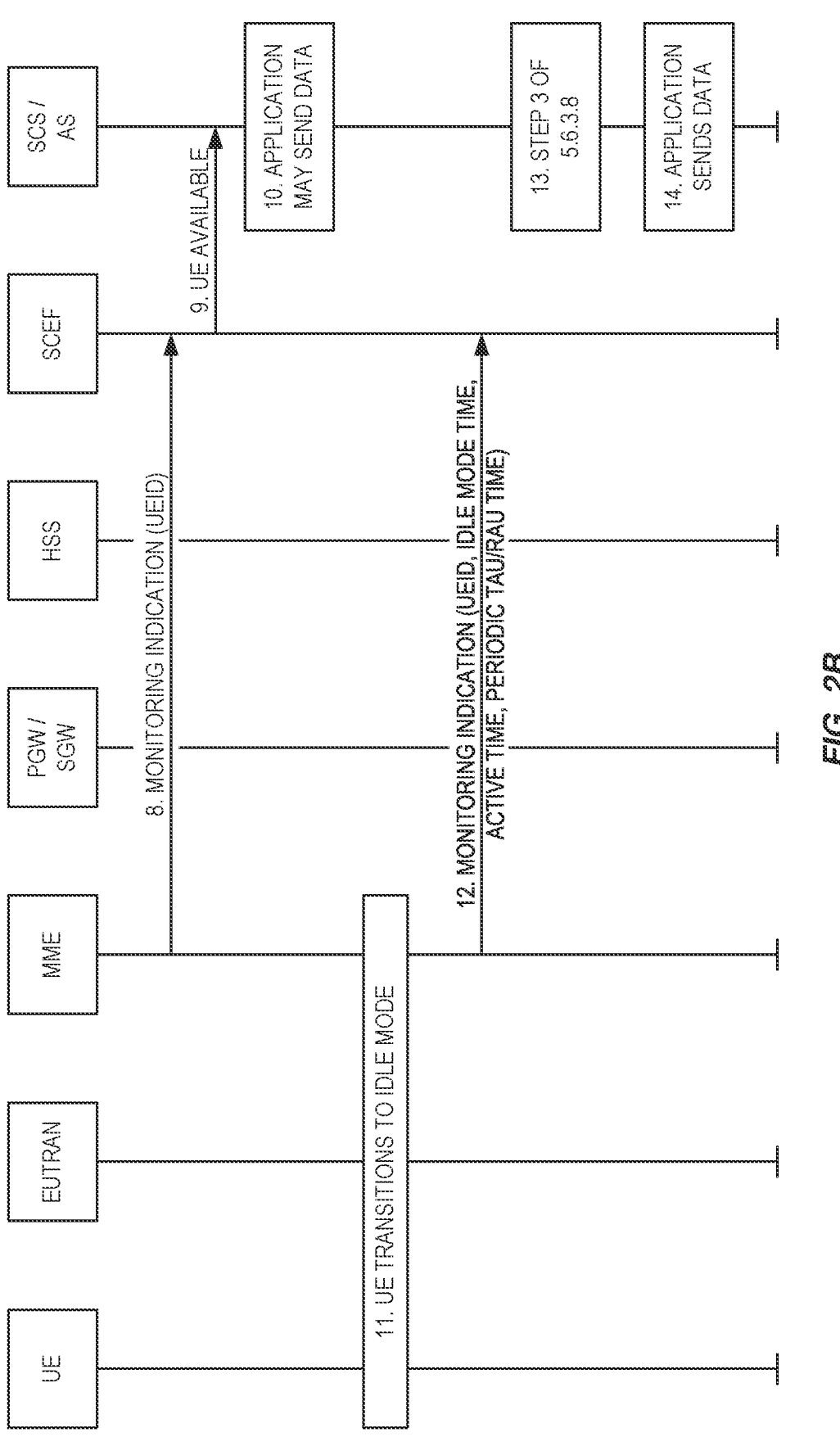

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

The subject matter disclosed herein provides a solution to enable a target node, such as a Mobility Management Entity (MME), a Serving General Packet Radio Service Support Node (SGSN), a Core Access and Mobility Management Function (AMF), or other node, to correctly notify a Service Capability Exposure Function (SCEF), Network Exposure Function (NEF), Application Server (AS), or other node, during an inter-MME/SGSN/AMF mobility procedure.

In some embodiments according to the subject matter disclosed herein, in Evolved Packet System (EPS) and Fifth Generation System (5GS) architectures, during an idle or connected mode mobility procedure, the source MME/SGSN/AMF shall include two new flags or information elements to instruct the target MME/SGSN/AMF to notify the SCEF/NEF/AS when the UE becomes reachable for downlink data and when the UE enters IDLE mode, respectively. In some embodiments, the two flags are:

A "Notify SCEF when UE becomes Reachable" (NSUR) flag, which is used to instruct the target MME/SGSN/AMF to notify the SCEF/NEF/AS when the UE becomes reachable for downlink data, and A "Notify SCEF when UE becomes Idle" (NSUI) flag, which is used to instruct the target MME/SGSN/AMF to notify the SCEF/NEF/AS when the UE enters IDLE mode.

Idle mode mobility transfer. In some embodiments, these flags may be sent from the source MME/SGSN/AMF serving the UE to the target MME/SGSN/AMF during an idle mode mobility procedure. Example idle mode mobility procedures include, but are not limited to: when sending a Context Response message; when sending an Identification Response message; and/or when the source AMF responds to a HTTP POST request to invoke "transfer" custom method on an "Individual ueContext" resource URI.

Connected mode mobility transfer. In some embodiments, these flags may be sent from the source MME/SGSN/AMF serving the UE to the target MME/SGSN/AMF during a connected mode mobility procedure, e.g. a handover procedure. Example connected mode mobility procedures include, but are not limited to, when sending a Forward Relocation Request or a HTTP PUT . . . /ue-contexts/{ueContextId}(UeContextCreateData).

Monitoring types. In some embodiments, these flags may be set in response to a request to subscribe to a monitoring event with a Monitoring-Type set to "AVAILABILITY_AFTER_DDN_FAILURE", "UE_REACHABILITY_AND_IDLE_STATUS_INDICATION", "AVAILABILITY_AFTER_DDN_FAILURE_AND_IDLE_STATUS_INDICATION", and "UE_REACHABILITY", for example, and if the source SGSN/MME/AMF requests that the target SGSN/MME/AMF notify the SCEF/NEF/AS when the UE becomes reachable and/or enters the IDLE state. For example, these flags may be set when the internal notify-on-available-after-DDN-failure flag has been set by the source MME/SGSN/AMF after a previous failed downlink data delivery, e.g., due to the UE being in power saving mode at the time.

In some alternative embodiments, the target MME/SGSN/AMF may also infer that certain notifications are required, based on the Monitoring-Type information received from the source MME/SGSN/AMF. For example:

Idle mode mobility procedure. In some embodiments, during an idle mode mobility procedure, the target MME/SGSN/AMF shall always notify the SCEF/NEF/AS when the UE becomes reachable, if the monitoring event with the Monitoring-Type is set to "AVAILABILITY_AFTER_DDN_FAILURE" or "UE_REACHABILITY". In some embodiments, the target MME/SGSN/AMF shall always notify the SCEF/NEF/AS when the UE enters the IDLE mode, if the Monitoring-Type is set to "UE_REACHABILITY_AND_IDLE_STATUS_INDICATION" or "AVAILABILITY_AFTER_DDN_FAILURE_AND_IDLE_STATUS_INDICATION".

Connected mode mobility procedure. In some embodiments, during a connected mode mobility procedure, the target MME/SGSN/AMF shall always notify the SCEF/NEF/AS when the UE enters the IDLE mode, if the Monitoring-Type is set to "UE_REACHABILITY_AND_IDLE_STATUS_INDICATION" or "AVAILABILITY_AFTER_DDN_FAILURE_AND_IDLE_STATUS_INDICATION".

In these alternative embodiments there is the potential to create additional, and possibly redundant, signaling, because the SCEF/NEF/AS may already have been notified by the source MME/SGSN/AMF (i.e. UE has become reachable once before the idle mode mobility procedure) and there is no more data to be sent towards the UE.

The following illustrates how the existing standard described in TS 23.682 could be modified to implement and support the methods proposed herein. The Monitoring Event Information is coded as depicted in TS 23.682, FIG. 8.120-1 and contains the monitoring event parameters that are necessary to transfer over the S3/S16/S10 interface.

Figure 3:
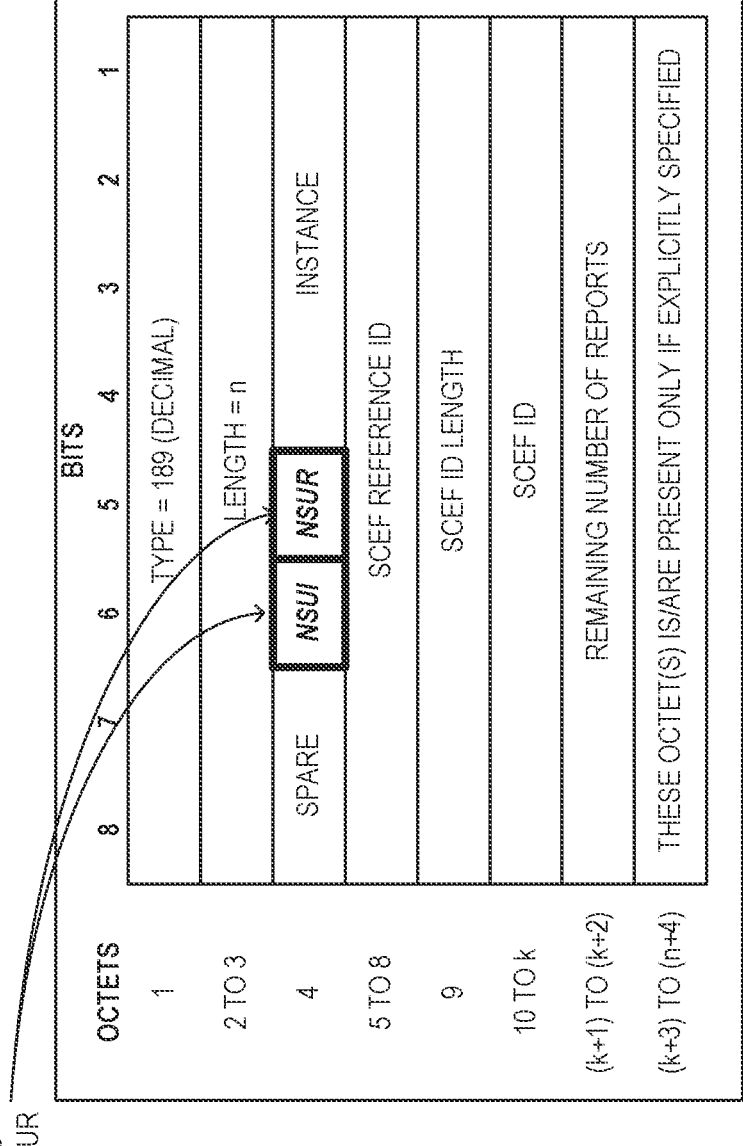
FIG. 3 illustrates modifications that could be made to the Monitoring Event Information data structure to support transferring monitoring event information during a mobility procedure according to the present disclosure.

FIG. 3 illustrates modifications that could be made to the Monitoring Event Information data structure to support transferring monitoring event information during a mobility procedure according to the present disclosure. In the embodiment illustrated in FIG. 3, the Monitoring Event Information data structure includes two new flags: one, named "NSUR", for indicating to the target MME/SGSN that it should notify the SCEF/NEF/AS when the UE becomes reachable, and the other, named "NSUI", for indicating to the target MME/SGSN that it should notify the SCEF/NEF/AS when the UE enters the IDLE state.

In some embodiments, the source MME/SGSN shall set the NSUR flag to "1" to indicate that the target MME/SGSN is to send a notification to SCEF when the UE becomes reachable, if the Monitoring-Type is set to "AVAILABILITY_AFTER_DDN_FAILURE", "UE_REACHABILITY_AND_IDLE_STATUS_INDICATION", "AVAILABILITY_AFTER_DDN_FAILURE_AND_IDLE_STATUS_INDICATION", or "UE_REACHABILITY".

In some embodiments, the source MME/SGSN shall set the NSUI flag to "1" to indicate that the target MME/SGSN is to send a notification to SCEF when the UE enters the IDLE mode, if the Monitoring-Type is set to "UE_REACHABILITY_AND_IDLE_STATUS_INDICATION", or "AVAILABILITY_AFTER_DDN_FAILURE_AND_IDLE_STATUS_INDICATION".

Figure 4:
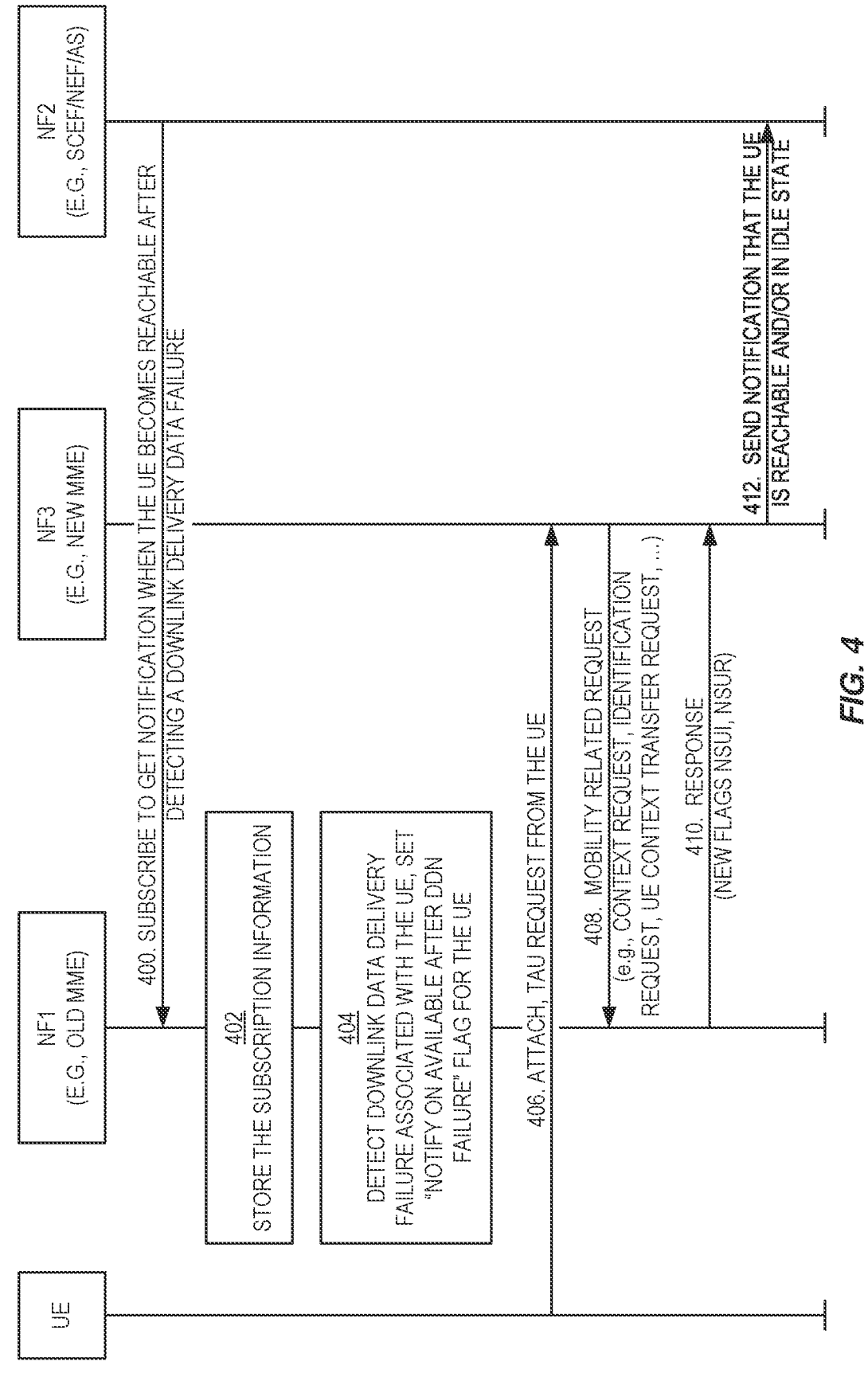
FIG. 4 illustrates an exemplary process for transferring monitoring event information during a mobility procedure according to the present disclosure.

FIG. 4 illustrates an exemplary process for transferring monitoring event information during a mobility procedure according to the present disclosure. In the embodiment illustrated in FIG. 4, a UE is being served by a first network function NF1, which may be a MME, a SGSN or an AMF. In FIG. 4 this source NF1 is referred to as the "old MME".

At step 400, a second network function NF2, which may be a SCEF a NEF or a AS, subscribes to get notification when the UE becomes reachable after a downlink data delivery failure. Thus, NF2 sends towards NF1, subscription information indicating that NF2 subscribes to get notification when the UE becomes reachable after a downlink data delivery failure.

At step 402, NF 1 stores the subscription information.

At step 404, NF1 detects a downlink data delivery failure associated with the UE. Preferably, NF1 sets a "NOTIFY ON AVAILABLE AFTER DDN FAILURE" flag for the UE.

At step 406, a third network function NF3, which may be a MME, a SGSN or an AMF, receives from the UE an ATTACH request or a TAU request. In FIG. 4 this target NF3 is referred to as the "new MME"

At step 408, the NF3 makes a mobility related request to the NF1. For example, NF2 may make a context request, an identification request, an HTTP message, such as "POST . . . /ue-contexts/{ueContextId}/transfer (UeContextTransferReqData)", or other message. For example, the mobility related request may be a Context Request, an Identification Request or a UE Context Transfer Request.

At step 410, the NF1 responds to the mobility related request by sending to the NF3 a response that includes new flags NSUI and/or NSUR. With the information provided by NSUI and/or NSUR, the NF3 knows whether or not it should notify the SCEF/NEF/AS when the UE becomes available and/or goes into IDLE mode.

At step 411, the NF2 notifies a SCEF/NEF/AS, etc., that the UE is reachable and/or in the IDLE state.

Some Advantages of the Present Subject Matter

In conventional networks, under certain mobility conditions the SCEF will fail to get a notification that the UE became reachable and/or that the UE entered the IDLE state, e.g., after a DDN failure. Under those such conditions the high latency communication may not work properly. The methods and systems disclosed herein improve the passing of event monitoring information between network nodes involved in mobility procedures and thereby provide benefits such as improving the reliability of event notifications involving high latency communication devices.

Figure 5:
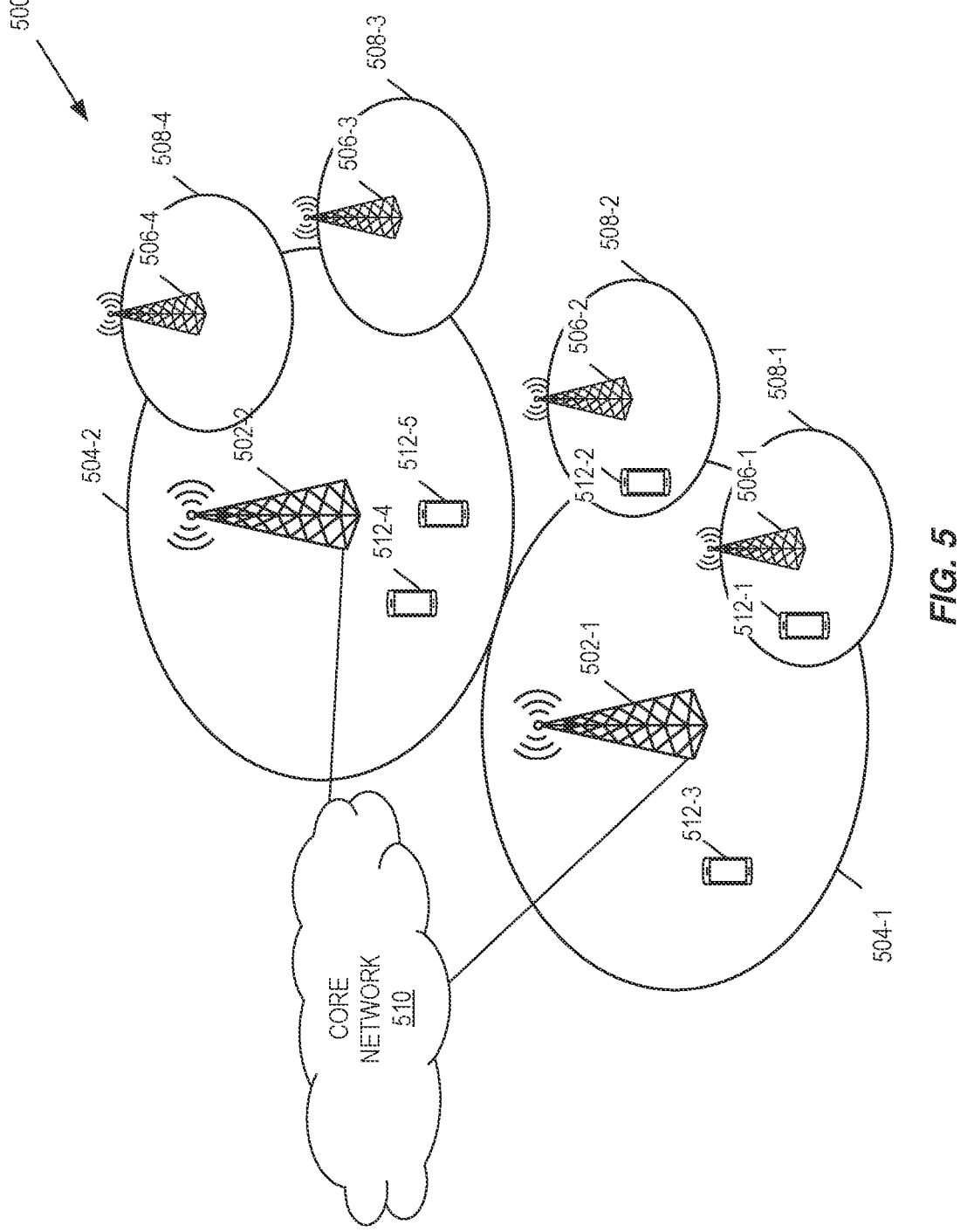
FIG. 5 illustrates one example of a cellular communications network according to some embodiments of the present disclosure.

FIG. 5 illustrates one example of a cellular communications network 500 according to some embodiments of the present disclosure. In the embodiments described herein, the cellular communications network 500 is a Fifth Generation (5G) New Radio (NR) network. In this example, the cellular communications network 500 includes base stations 502-1 and 502-2, which in LTE are referred to as eNBs and in 5G NR are referred to as gNBs, controlling corresponding macro cells 504-1 and 504-2. The base stations 502-1 and 502-2 are generally referred to herein collectively as base stations 502 and individually as base station 502. Likewise, the macro cells 504-1 and 504-2 are generally referred to herein collectively as macro cells 504 and individually as macro cell 504. The cellular communications network 500 may also include a number of low power nodes 506-1 through 506-4 controlling corresponding small cells 508-1 through 508-4. The low power nodes 506-1 through 506-4 can be small base stations (such as pico or femto base stations) or Remote Radio Heads (RRHs), or the like. Notably, while not illustrated, one or more of the small cells 508-1 through 508-4 may alternatively be provided by the base stations 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell 508. The base stations 502 (and optionally the low power nodes 506) are connected to a core network 510.

The base stations 502 and the low power nodes 506 provide service to wireless devices 512-1 through 512-5 in the corresponding cells 504 and 508. The wireless devices 512-1 through 512-5 are generally referred to herein collectively as wireless devices 512 and individually as wireless device 512. The wireless devices 512 are also sometimes referred to herein as UEs.

Figure 6:
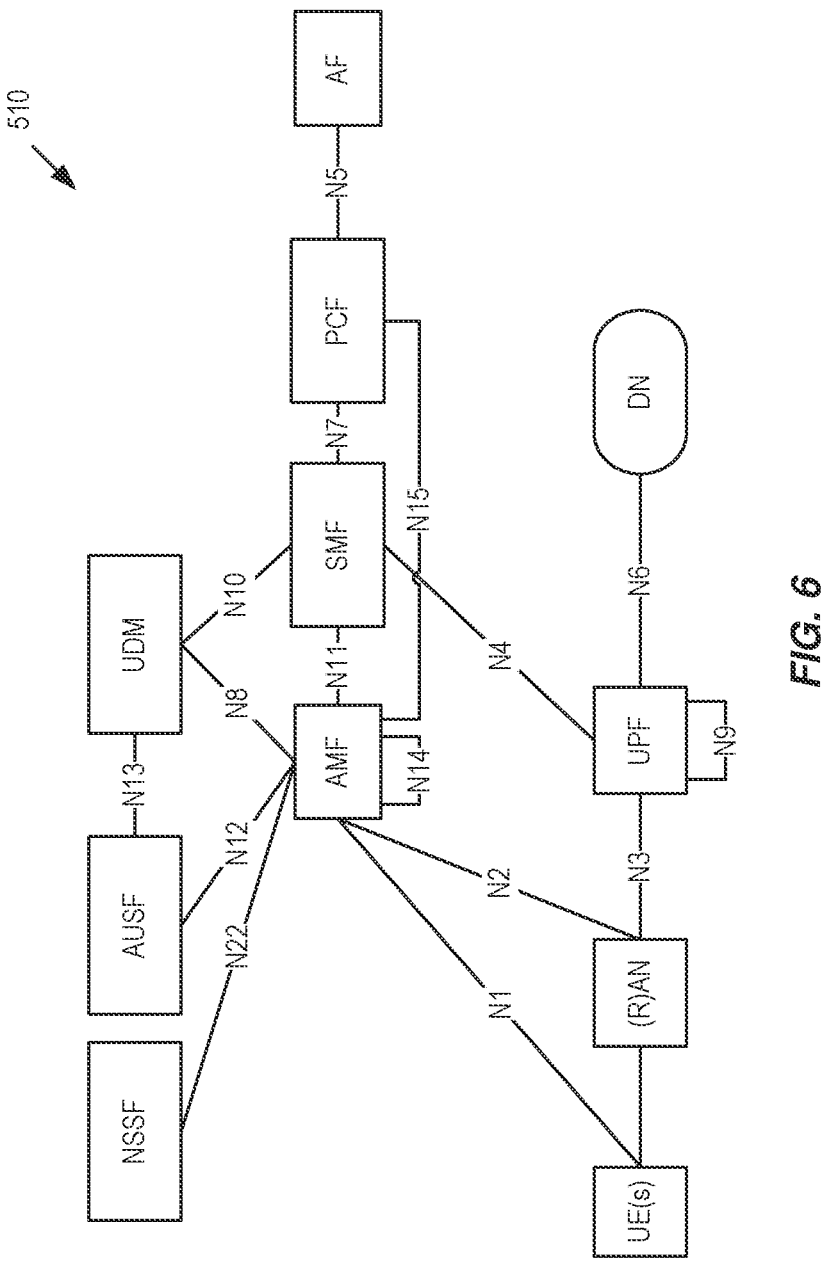
FIG. 6 illustrates a wireless communication system represented as a 5G network architecture composed of core Network Functions (NFs), where interaction between any two NFs is represented by a point-to-point reference point/interface.

FIG. 6 illustrates a wireless communication system represented as a 5G network architecture composed of core Network Functions (NFs), where interaction between any two NFs is represented by a point-to-point reference point/ interface. FIG. 6 can be viewed as one particular implementation of the system 500 of FIG. 5.

Seen from the access side the 5G network architecture shown in FIG. 6 comprises a plurality of User Equipment (UEs) connected to either a Radio Access Network (RAN) or an Access Network (AN) as well as an Access and Mobility Management Function (AMF). Typically, the R(AN) comprises base stations, e.g. such as evolved Node Bs (eNBs) or 5G base stations (gNBs) or similar. Seen from the core network side, the 5G core NFs shown in FIG. 6 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 6, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 6. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 7:
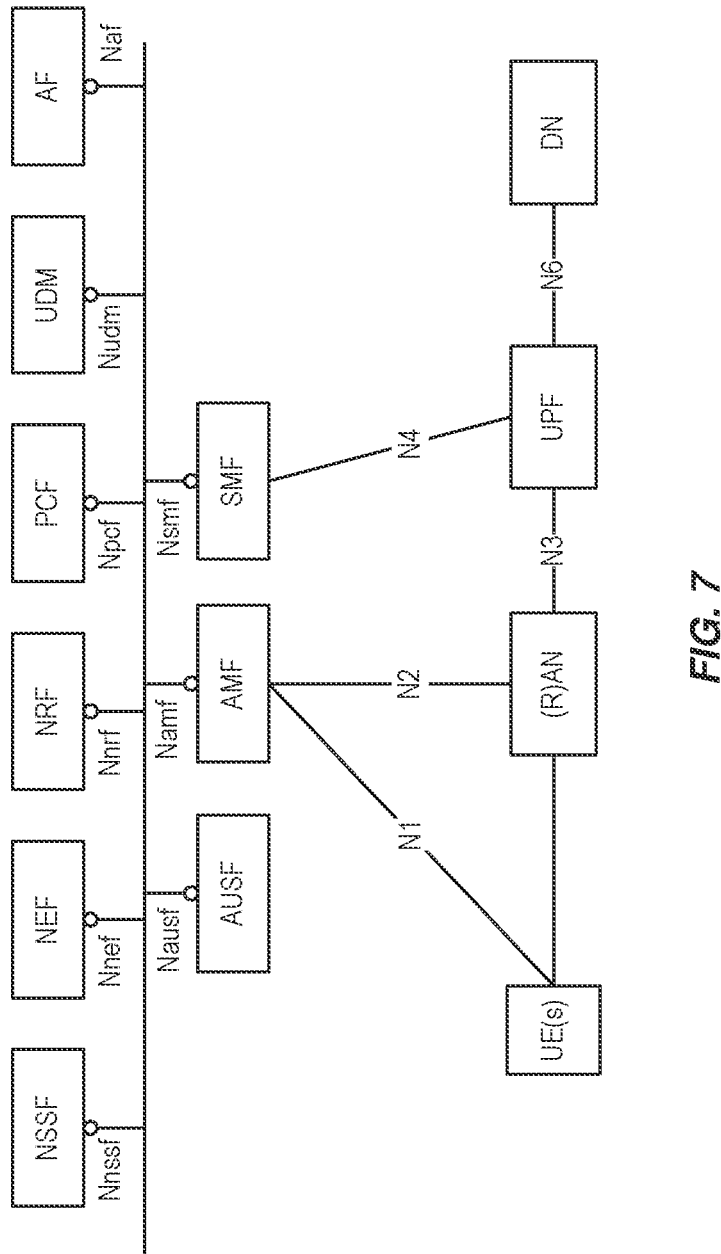
FIG. 7 illustrates a 5G network architecture using service-based interfaces between the NFs in the control plane, instead of the point-to-point reference points/interfaces used in the 5G network architecture of FIG. 6.

FIG. 7 illustrates a 5G network architecture using service-based interfaces between the NFs in the control plane, instead of the point-to-point reference points/interfaces used in the 5G network architecture of FIG. 6. However, the NFs described above with reference to FIG. 6 correspond to the NFs shown in FIG. 7. The service(s) etc. that a NF provides to other authorized NFs can be exposed to the authorized NFs through the service-based interface. In FIG. 7 the service based interfaces are indicated by the letter "N" followed by the name of the NF, e.g. Namf for the service based interface of the AMF and Nsmf for the service based interface of the SMF etc. The Network Exposure Function (NEF) and the Network Repository Function (NRF) in FIG. 7 are not shown in FIG. 6 discussed above. However, it should be clarified that all NFs depicted in FIG. 6 can interact with the NEF and the NRF of FIG. 7 as necessary, though not explicitly indicated in FIG. 6.

Some properties of the NFs shown in FIGS. 6 and 7 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 8:
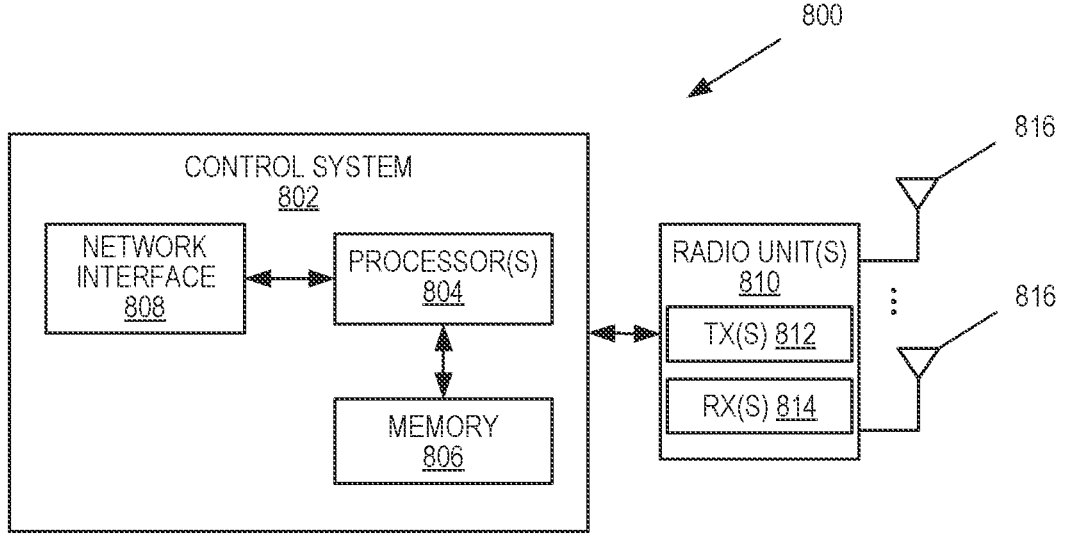
FIG. 8 is a schematic block diagram of a radio access node according to some embodiments of the present disclosure.

FIG. 8 is a schematic block diagram of a radio access node 800 according to some embodiments of the present disclosure. The radio access node 800 may be, for example, a base station 502 or 506. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the radio access node 800 includes one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a radio access node 800 as described herein. In some embodiments, the function(s) are implemented in software that is stored, e.g., in the memory 806 and executed by the one or more processors 804.

Figure 9:
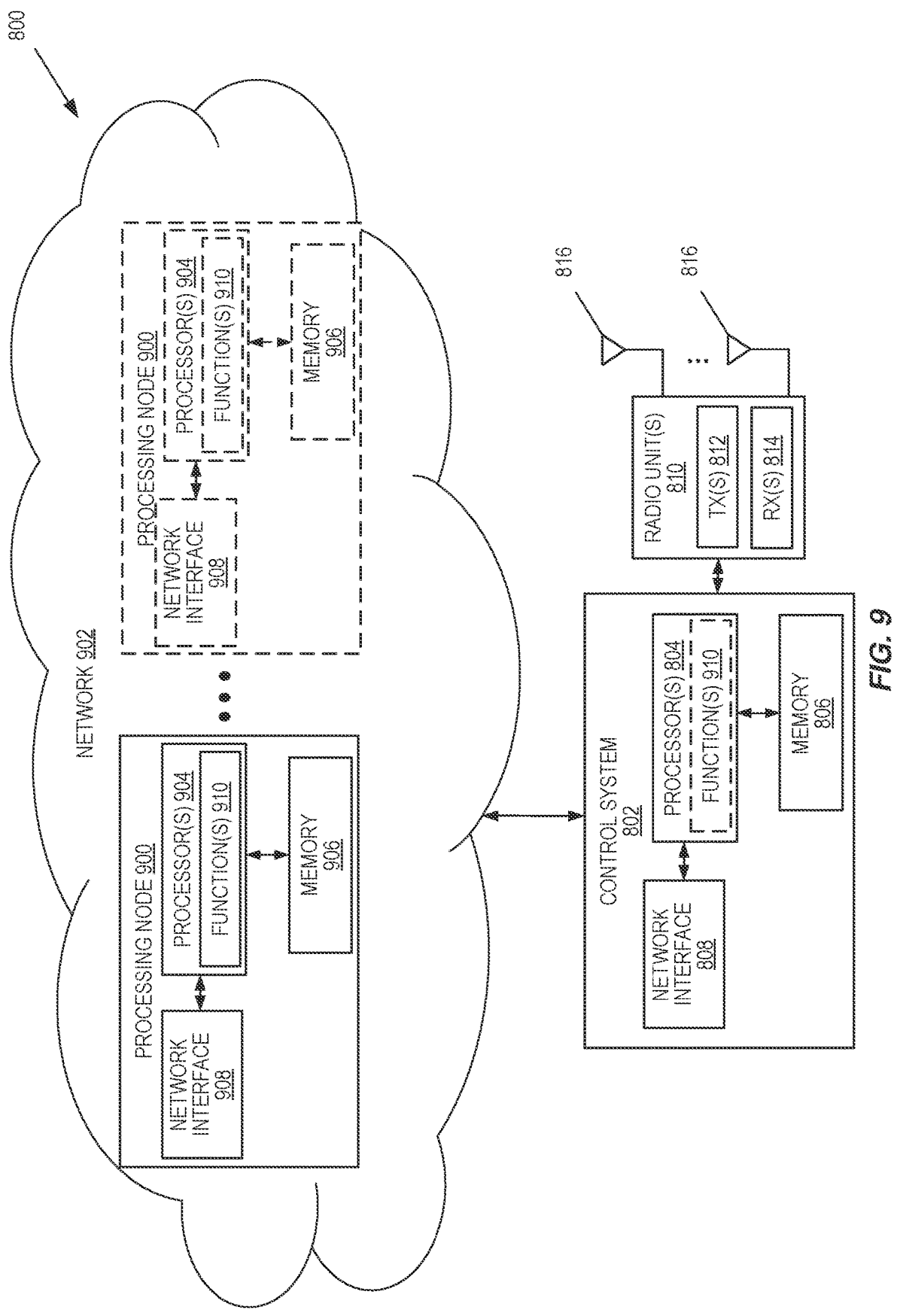
FIG. 9 is a schematic block diagram that illustrates a virtualized embodiment of the radio access node of FIG. 8 according to some embodiments of the present disclosure.

FIG. 9 is a schematic block diagram that illustrates a virtualized embodiment of the radio access node 800 according to some embodiments of the present disclosure. This discussion is equally applicable to other types of network nodes, e.g. such as the MME, SGSN and the AMF. Further, other types of network nodes may have similar virtualized architectures.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 includes the control system 802 that includes the one or more processors 804 (e.g., CPUs, ASICs, FPGAs, and/or the like), the memory 806, and the network interface 808 and possibly one or more radio units 810 that each includes the one or more transmitters 812 and the one or more receivers 814 coupled to the one or more antennas 816, as described above. The control system 802 may be connected to radio unit(s) 810 via, for example, an optical cable or the like. The control system 802 is connected to one or more processing nodes 900 coupled to or included as part of a network(s) 902 via the network interface 808. Each processing node 900 includes one or more processors 904 (e.g., CPUs, ASICs, FPGAs, and/or the like), memory 906, and a network interface 908.

In this example, functions 910 of the radio access node 800 described herein are implemented at the one or more processing nodes 900 or distributed across the control system 802 and the one or more processing nodes 900 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included.

In some embodiments, a computer program including instructions which, when executed by at least one processor, causes the at least one processor to carry out the functionality of radio access node 800 or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
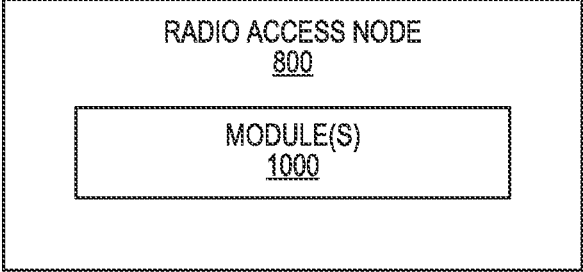
FIG. 10 is a schematic block diagram of the radio access node of FIG. 8 according to some other embodiments of the present disclosure.

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
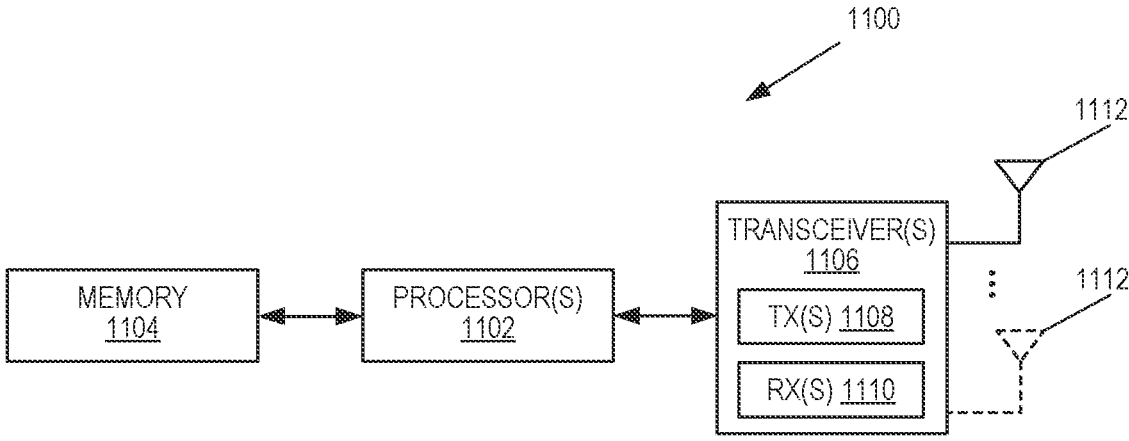
FIG. 11 is a schematic block diagram of a User Equipment device (UE) according to some embodiments of the present disclosure.

FIG. 11 is a schematic block diagram of a UE 1100 according to some embodiments of the present disclosure. As illustrated, the UE 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by on of ordinary skill in the art. The processors 1102 are also referred to herein as processing circuitry. The transceivers 1106 are also referred to herein as radio circuitry. In some embodiments, the functionality of the UE 1100 described above may be fully or partially implemented in software that is, e.g., stored in the memory 1104 and executed by the processor(s) 1102. Note that the UE 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the UE 1100 and/or allowing output of information from the UE 1100), a power supply (e.g., a battery and associated power circuitry), etc.

In some embodiments, a computer program including instructions which, when executed by at least one processor, causes the at least one processor to carry out the functionality of the UE 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
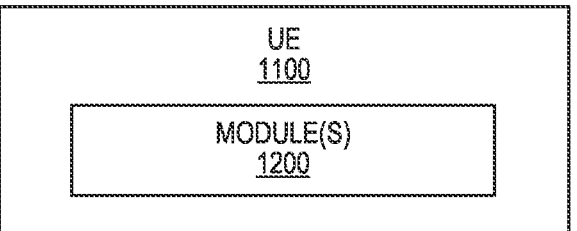
FIG. 12 is a schematic block diagram of the UE of FIG. 11 according to some other embodiments of the present disclosure.

FIG. 12 is a schematic block diagram of the UE 1100 according to some other embodiments of the present disclosure. The UE 1100 includes one or more modules 1200, each of which is implemented in software. The module(s) 1200 provide the functionality of the UE 1100 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Some Embodiments Described Above May Be Summarized in the Following Manner

1. A method for transferring monitoring event information during a mobility procedure for a User Equipment, UE, the method comprising:
at a source first network node (NF1):
    receiving (400) subscription information indicating that a subscribing second network node (NF2) has subscribed to get notification when there is a data delivery failure involving a UE, (512) followed by the UE becoming reachable;
    detecting (404) a data delivery failure involving the UE, and, in response to detecting the data delivery failure, setting a flag to indicate that a data delivery failure involving the UE has occurred;

receiving (408), from a target third network node (FN3) serving the UE, a mobility related request;

sending (410), to the target third network node, a response to the mobility related request, the response comprising at least one of:

monitoring event information comprising an indication that the target third network node should notify the subscribing second network node when the UE becomes reachable; and/or monitoring event information comprising an indication that the target third network node should notify the subscribing second network node when the UE enters IDLE state.

2. The method of embodiment 1 wherein the source first network node comprises a Mobility Management Entity, MME, a Serving General Packet Radio Service Support Node, SGSN, and/or a Core Access and Mobility Management Function, AMF.

3. The method of embodiment 1 or 2 wherein the subscribing second network node comprises a Service Capability Exposure Function, SCEF, a Network Exposure Function, NEF, and/or an Application Server, AS.

4. The method of any of embodiments 1-3 wherein the target third network node comprises a Mobility Management Entity, MME, a Serving General Packet Radio Service Support Node, SGSN, and/or a Core Access and Mobility Management Function, AMF.

5. The method of any of embodiments 1-4, wherein the flag to indicate that a data delivery failure involving the UE has occurred comprises a notify on available after a Data Downlink Notification, DDN, failure flag.

6. The method of any of embodiments 1-5, wherein the mobility related request is associated with an idle mode mobility procedure or a connected mode mobility procedure.

7. The method of any of embodiments 1-6, wherein the mobility related request comprises a context request message, an identification request message, a forward relocation request message, a create context message, and/or a Hypertext Transfer Protocol, HTTP, request to invoke a transfer custom method on an individual UE context resource Uniform Resource Identifier, URI.

8. The method of any of embodiments 1-7 wherein the indication that the target third network node should notify the subscribing second network node when the UE becomes reachable and the indication that the target third network node should notify the subscribing second network node when then UE enters the IDLE state are comprised in a Monitoring Event Information data structure.

9. The method of any of embodiments 1-8 wherein the monitoring event information comprising at least one of:

a Notify SCEF when UE becomes Reachable, NSUR, flag which indicates that the target network node should notify the subscribing second network node when the UE becomes reachable; and/or a Notify SCEF when UE becomes Idle, NSUI, flag which indicates that the target third network node should notify the subscribing second network node when then UE enters the IDLE state.

10. A method for transferring monitoring event information during a mobility procedure for a User Equipment, UE, the method comprising:

at a target third network node (NF3) serving the UE:

sending (408), to a source first network node (NF1), a mobility related request;

receiving (410), from the source first network node, a response to the mobility related request, the response comprising at least one of:

monitoring event information comprising an indication that the target third network node should notify a subscribing second network node (NF2) when the UE becomes reachable; and/or monitoring event information comprising an indication that the target third network node should notify the subscribing second network node when the UE enters IDLE state.

11. The method of embodiment 10 wherein the source first network node comprises a Mobility Management Entity, MME, a Serving General Packet Radio Service Support Node, SGSN, and/or a Core Access and Mobility Management Function, AMF.

12. The method of embodiment 9 or 10 wherein the subscribing second network node comprises a Service Capability Exposure Function, SCEF, a Network Exposure Function, NEF, and/or an Application Server, AS.

13. The method of any of embodiments 10 12 wherein the target third network node comprises a Mobility Management Entity, MME, a Serving General Packet Radio Service Support Node, SGSN, and/or a Core Access and Mobility Management Function, AMF.

14. The method of any of embodiments 10 13 wherein the mobility related request is associated with an idle mode mobility procedure or a connected mode mobility procedure.

15. The method of any of embodiments 10 14 wherein the mobility related request comprises a context request message, an identification request message, a forward relocation request message, a create context message, and/or a Hypertext Transfer Protocol, HTTP, request to invoke a transfer custom method on an individual UE context resource Uniform Resource Identifier, URI.

16. The method of any of embodiments 10 15 wherein the indication that the target third network node should notify the subscribing second network node when the UE becomes reachable and the indication that the target third network node should notify the subscribing second network node when then UE enters the IDLE state are comprised in a Monitoring Event Information data structure.

17. The method of any of embodiments 10 16, further comprising sending, to the subscribing second network node, a notification that the UE is reachable and/or in the IDLE state.

18. The method of any of embodiments 10-17 wherein the monitoring event information comprising at least one of:

a Notify SCEF when UE becomes Reachable, NSUR, flag which indicates that the target network node should notify the subscribing second network node when the UE becomes reachable; and/or a Notify SCEF when UE becomes Idle, NSUI, flag which indicates that the target third network node should notify the subscribing second network node when then UE enters the IDLE state.

19. A source first network node (NF1) configured to operatively transfer monitoring event information during a mobility procedure for a User Equipment, UE, the network node comprising:

one or more processors; and memory storing instructions executable by the one or more processors whereby the network node is operable to:

receive (400) subscription information indicating that a subscribing second network node (NF2) has subscribed to get notification when there is a data delivery failure involving a UE (512) followed by the UE becoming reachable;

detect (404) a data delivery failure involving the UE, and, in response to detecting the data delivery failure, setting a flag to indicate that a data delivery failure involving the UE has occurred;

receive (408), from a target third network node (FN3) serving the UE, a mobility related request;

send (410), to the target third network node, a response to the mobility related request, the response comprising at least one of:

monitoring event information comprising an indication that the target third network node should notify the subscribing second network node when the UE becomes reachable; and/or monitoring event information comprising an indication that the target third network node should notify the subscribing second network node when the UE enters IDLE state.

20. A source first network node according to embodiment 19, the network node comprising:

one or more processors; and memory storing instructions executable by the one or more processors whereby the network node is operable to perform the steps of any of embodiments 2-9.

21. A target third network node (NF3) configured to operatively serve a User Equipment, UE, and to operatively transfer monitoring event information during a mobility procedure for the UE, the network node comprising:

one or more processors; and memory storing instructions executable by the one or more processors whereby the network node is operable to:

send (408), to a source first network node (NF1), a mobility related request;

receive (410), from the source first network node, a response to the mobility related request, the response comprising at least one of:

monitoring event information comprising an indication that the target third network node should notify a subscribing second network node (NF2) when the UE becomes reachable; and/or monitoring event information comprising an indication that the target third network node should notify the subscribing second network node when the UE enters IDLE state.

21. A target third network node according to embodiment 20, the network node comprising:

one or more processors; and memory storing instructions executable by the one or more processors whereby the network node is operable to perform the steps of any of embodiments 11-18.

22. A network node configured to transfer monitoring event information during a mobility procedure, the network node comprising processing circuitry configured to perform the steps of any of embodiments 1-18.

23. A network node for transferring monitoring event information during a mobility procedure, the network node comprising modules operable to perform the steps of any of embodiments 1-18.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GS Fifth Generation System
AF Application Function
AMF Access and Mobility Management Function
AN Access Network
AS Application Server
AUSF Authentication Server Function
DDN Data Downlink Notification
DN Data Network
DSP Digital Signal Processor
eNB Enhanced or Evolved Node B
EPS Evolved Packet System
FPGA Field Programmable Gate Array
gNB New Radio Base Station
GPRS General Packet Radio Service
HSS Home Subscriber Server
HTTP Hypertext Transfer Protocol
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
PCF Policy Control Function
P-GW Packet Data Network Gateway
PSM Power Saving Mode
QoS Quality of Service
RAM Random Access Memory
RAN Radio Access Network
ROM Read Only Memory
SCEF Service Capability Exposure Function
SGSN Serving General Packet Radio Service Support Node
SMF Session Management Function
TAU Tracking Area Update
TS Technical Specification
UDM Unified Data Management
UE User Equipment
URI Uniform Resource Identifier Those skilled in the art will recognize improvements and modifications to the embodiments of the present disclosure. All such improvements and modifications are considered within the scope of the concepts disclosed herein.

The invention claimed is:

1. A method for transferring monitoring event information during a mobility procedure for a User Equipment, UE, the method comprising:

at a source first core network node:

receiving subscription information indicating that a subscribing second core network node has subscribed to get notification when there is a data delivery failure involving a UE, followed by the UE becoming reachable;

detecting a data delivery failure involving the UE, and, in response to detecting the data delivery failure, setting a flag to indicate that a data delivery failure involving the UE has occurred;

receiving, from a target third core network node serving the UE, a mobility related request;

sending, to the target third core network node, a response to the mobility related request, the response comprising at least one of:

monitoring event information comprising an indication that the target third core network node should notify the subscribing second core network node when the UE becomes reachable; and/or monitoring event information comprising an indication that the target third core network node should notify the subscribing second core network node when the UE enters IDLE state.

2. The method of claim 1, wherein the flag to indicate that a data delivery failure involving the UE has occurred comprises a notify on available after a Data Downlink Notification, DDN, failure flag.

3. The method of claim 1, wherein the mobility related request is associated with an idle mode mobility procedure or a connected mode mobility procedure.

4. The method of claim 1, wherein the mobility related request comprises a context request message, an identification request message, a forward relocation request message, a create context message, and/or a Hypertext Transfer Protocol, HTTP, request to invoke a transfer custom method on an individual UE context resource Uniform Resource Identifier, URI.

5. The method of claim 1 wherein the indication that the target third core network node should notify the subscribing second core network node when the UE becomes reachable and the indication that the target third core network node should notify the subscribing second core network node when then UE enters the IDLE state are comprised in a Monitoring Event Information data structure.

6. The method of claim 1 wherein the monitoring event information comprising at least one of:

a Notify SCEF when UE becomes Reachable, NSUR, flag which indicates that the target core network node should notify the subscribing second core network node when the UE becomes reachable; and/or a Notify SCEF when UE becomes Idle, NSUI, flag which indicates that the target third core network node should notify the subscribing second core network node when then UE enters the IDLE state.

7. A method for transferring monitoring event information during a mobility procedure for a User Equipment, UE, the method comprising:

at a target third core network node serving the UE:

sending, to a source first core network node, a mobility related request;

receiving, from the source first core network node, a response to the mobility related request, the response comprising at least one of:

monitoring event information comprising an indication that the target third core network node should notify a subscribing second core network node when the UE becomes reachable; and/or monitoring event information comprising an indication that the target third core network node should notify the subscribing second core network node when the UE enters IDLE state.

8. The method of claim 7 wherein the mobility related request is associated with an idle mode mobility procedure or a connected mode mobility procedure.

9. The method of claim 7 wherein the mobility related request comprises a context request message, an identification request message, a forward relocation request message, a create context message, and/or a Hypertext Transfer Protocol, HTTP, request to invoke a transfer custom method on an individual UE context resource Uniform Resource Identifier, URI.

10. The method of claim 7 wherein the indication that the target third core network node should notify the subscribing second core network node when the UE becomes reachable and the indication that the target third core network node should notify the subscribing second core network node when then UE enters the IDLE state are comprised in a Monitoring Event Information data structure.

11. The method of claim 7, further comprising sending, to the subscribing second core network node, a notification that the UE is reachable and/or in the IDLE state.

12. The method of claim 7 wherein the monitoring event information comprising at least one of:

a Notify SCEF when UE becomes Reachable, NSUR, flag which indicates that the target core network node should notify the subscribing second core network node when the UE becomes reachable; and/or a Notify SCEF when UE becomes Idle, NSUI, flag which indicates that the target third core network node should notify the subscribing second core network node when then UE enters the IDLE state.

13. A source first core network node configured to operatively transfer monitoring event information during a mobility procedure for a User Equipment, UE, the core network node comprising:

one or more processors; and memory storing instructions executable by the one or more processors whereby the core network node is operable to:

receive subscription information indicating that a subscribing second core network node has subscribed to get notification when there is a data delivery failure involving a UE followed by the UE becoming reachable;

detect a data delivery failure involving the UE, and, in response to detecting the data delivery failure, setting a flag to indicate that a data delivery failure involving the UE has occurred;

receive, from a target third core network node serving the UE, a mobility related request;

send, to the target third core network node, a response to the mobility related request, the response comprising at least one of:

monitoring event information comprising an indication that the target third core network node should notify the subscribing second core network node when the UE becomes reachable; and/or monitoring event information comprising an indication that the target third core network node should notify the subscribing second core network node when the UE enters IDLE state.

14. A target third core network node configured to operatively serve a User Equipment, UE, and to operatively transfer monitoring event information during a mobility procedure for the UE, the core network node comprising:

one or more processors; and memory storing instructions executable by the one or more processors whereby the core network node is operable to:

send, to a source first core network node, a mobility related request;

receive, from the source first core network node, a response to the mobility related request, the response comprising at least one of:

monitoring event information comprising an indication that the target third core network node should notify a subscribing second core network node when the UE becomes reachable; and/or monitoring event information comprising an indication that the target third core network node should notify the subscribing second core network node when the UE enters IDLE state.

15. A core network node configured to transfer monitoring event information during a mobility procedure, the core network node comprising processing circuitry configured to:

receive subscription information indicating that a subscribing second core network node has subscribed to get notification when there is a data delivery failure involving a UE, followed by the UE becoming reachable;

detect a data delivery failure involving the UE, and, in response to detecting the data delivery failure, setting a flag to indicate that a data delivery failure involving the UE has occurred;

receive, from a target third core network node serving the UE, a mobility related request;

send, to the target third core network node, a response to the mobility related request, the response comprising at least one of:

monitoring event information comprising an indication that the target third core network node should notify the subscribing second core network node when the UE becomes reachable; and/or monitoring event information comprising an indication that the target third core network node should notify the subscribing second core network node when the UE enters IDLE state.

16. A core network node configured to transfer monitoring event information during a mobility procedure, the core network node comprising processing circuitry configured to:

send, to a source first core network node, a mobility related request;

receiving, from the source first core network node, a response to the mobility related request, the response comprising at least one of:

monitoring event information comprising an indication that the target third core network node should notify a subscribing second core network node when the UE becomes reachable; and/or monitoring event information comprising an indication that the target third core network node should notify the subscribing second core network node when the UE enters IDLE state.

* * * * *